(12) United States Patent
Wolf

(10) Patent No.: US 8,635,208 B2
(45) Date of Patent: Jan. 21, 2014

(54) MULTI-STATE QUERY MIGRATION IN DATA STREAM MANAGEMENT

(75) Inventor: Bernhard Wolf, Dresden (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/288,638

(22) Filed: Nov. 3, 2011

(65) Prior Publication Data

US 2013/0117317 A1     May 9, 2013

(51) Int. Cl.
*G06F 7/00*     (2006.01)
*G06F 17/30*    (2006.01)

(52) U.S. Cl.
USPC ............................ 707/720; 707/719; 707/792

(58) Field of Classification Search
USPC ......................................... 707/719, 792, 720
See application file for complete search history.

(56) References Cited

U.S. PATENT DOCUMENTS

2010/0153363 A1* 6/2010 Suzuki et al. ................. 707/720

OTHER PUBLICATIONS

Wolf, et al, "Data Stream Processing in Factory Automation", 2010 IEEE Conference on Emerging Technologies and Factory Automation (ETFA), Sep. 2010, 8 pages.
Olf, et al, "On-the-fly Adaptation of Data Stream Queries", 2010 13th IEEE International Symposium on Object/Component/Service-Oriented Real-Time Distributed Computing, May 2010, 5 pages.
Extended European Search Report for EP Application No. 12007450.5, mailed Apr. 25, 2013, 9 pages.

* cited by examiner

*Primary Examiner* — Ann Chempakaseril
(74) *Attorney, Agent, or Firm* — Brake Hughes Bellermann LLP

(57) ABSTRACT

A request handler may determine a query of a data stream management system (DSMS), wherein the query includes a plurality of operators being configured to execute the query collaboratively within the DSMS, and wherein stored stream-related data includes operator-associated windows of state data from the stream data, the request handler being further configured to determine a new query having new windows corresponding to the windows of the original query. A windows sorter may sort the new windows from longest duration to shortest duration to obtain a sorted new windows list. A migration estimator may calculate individual migration times for migrating state data from each window to its corresponding new window, beginning with the longest new window of the sorted new windows list. A migration aggregator may aggregate the individual migration times to obtain a total migration time for the new query.

21 Claims, 8 Drawing Sheets

MULTI-STATE QUERY MIGRATION IN DATA STREAM MANAGEMENT

TECHNICAL FIELD

This description relates to query migration in data stream management.

BACKGROUND

In traditional databases and data management systems, data is stored in an essentially static form within one or more computer memories. That is, the data may generally be altered when desired, but at any given moment the stored data represents a discrete, static, finite, persistent data set against which, e.g., queries may be issued.

In many settings, however, data may not be effectively or usefully managed in this way. In particular, it may occur that data arrives essentially continuously, as a stream of data points corresponding, e.g., to real-world events. Data stream management systems (DSMS) have been developed to make use of such data.

For example, data representing events within a manufacturing facility may fluctuate over the course of a day and/or over the lifetime of equipment within the facility. Such data may provide insight into an operational status of the facility, in order to optimize such operations. Additional/alternative examples of such data streams include temperature or other environmental data collected by sensors, computer network analytics, patient health data, or data describing business process(es).

During runtime, pre-stored queries may be applied against the data as the data arrives. For example, a portion of the data, generally referred to as a window of data, may be temporarily stored in main memory, and the queries are applied against the stored data portion before the stored data portion is deleted from storage. The stored data at a given point in time thus represents a state of the query at that time, where it may be appreciated that such state information is volatile, and changes as new data arrives. However, if one of the queries must be modified, then conventional systems must generally restart the query in question. Consequently, the stored data portion, i.e., the state of the query, is then unavailable or erased, so that new data must be collected before the new queries may be applied. This may result in a harmful delay and/or related difficulties for the user of the DSMS.

Therefore, some implementations of a DSMS attempt to migrate queries while maintaining relevant state information. In such migrations, the DSMS in question may continue processing an existing query, while migrating state data to a new query and beginning to process the new query as soon as possible. That is, both the original query and the new query may collect and process newly-arriving data, while existing state data is simultaneously transferred from the original query to the new query. A goal of such migrations is to complete the migration quickly, while maintaining output of query results during the transition. However, in such systems, a query to be migrated may have multiple operators, each with its own, arbitrary window size and associated state information. Moreover, the resulting new query may have different window sizes than the original window sizes, and therefore may require different amounts of state data than may have been required by corresponding query operators of the original query. For these and other reasons, therefore, it may be difficult to estimate a migration time and related variables that will be experienced by a DSMS which migrates state data from an existing, multi-state query to a new query.

SUMMARY

According to one general aspect, a system may include instructions recorded on a computer-readable medium and executable by at least one processor. The system may include a request handler configured to cause the at least one process to determine a query of a data stream management system, the query currently being executed using stored stream data within a buffer associated with the query, the stored stream-related data being obtained from stream data received from at least one data source and being removed from the buffer in association with new stream data being received, wherein the query includes a plurality of operators being configured to execute the query collaboratively within the DSMS, and wherein the stored stream-related data includes operator-associated windows of state data from the stream data, the request handler being further configured to determine a new query having new windows corresponding to the windows of the query. The system may include a windows sorter configured to cause the at least one process to sort the new windows from longest duration to shortest duration to obtain a sorted new windows list. The system may also include a migration estimator configured to cause the at least one process to calculate individual migration times for migrating state data from each window to its corresponding new window, beginning with the longest new window of the sorted new windows list, and a migration aggregator configured to cause the at least one process to aggregate the individual migration times to obtain a total migration time for the new query.

According to another general aspect, a computer-implemented method for executing instructions stored on a computer readable storage medium may include determining a query of a data stream management system, the query currently being executed using stored stream-related data within a buffer associated with the query, the stored stream-related data being obtained from stream data received from at least one data source and being removed from the buffer in association with new stream data being received, wherein the query includes a plurality of operators being configured to execute the query collaboratively within the DSMS, and wherein the stored stream-related data includes operator-associated windows of state data from the stream data. The method may include determining a new query having new windows corresponding to the windows of the query, and sorting the new windows from longest duration to shortest duration to obtain a sorted new windows list. The method also may include calculating individual migration times for migrating state data from each window to its corresponding new window, beginning with the longest new window of the sorted new windows list, and aggregating the individual migration times to obtain a total migration time for the new query.

According to another general aspect, a computer program product may be tangibly embodied on a computer-readable storage medium and may include instructions that, when executed, are configured to determine a query of a data stream management system, the query currently being executed using stored stream-related data within a buffer associated with the query, the stored stream-related data being obtained from stream data received from at least one data source and being removed from the buffer in association with new stream data being received, wherein the query includes a plurality of operators being configured to execute the query collaboratively within the DSMS, and wherein the stored stream data includes operator-associated windows of state from the stream data. The instructions, when executed, may be further configured to determine a new query having new windows corresponding to the windows of the query, and sort the new windows from longest duration to shortest duration to obtain a sorted new windows list. The instructions, when executed, may be further configured to calculate individual migration times for migrating state data from each window to its corresponding new window, beginning with the longest new window of the sorted new windows list, and aggregate the individual migration times to obtain a total migration time for the new query.

The details of one or more implementations are set forth in the accompanying drawings and the description below. Other features will be apparent from the description and drawings, and from the claims.

DETAILED DESCRIPTION

Figure 1:
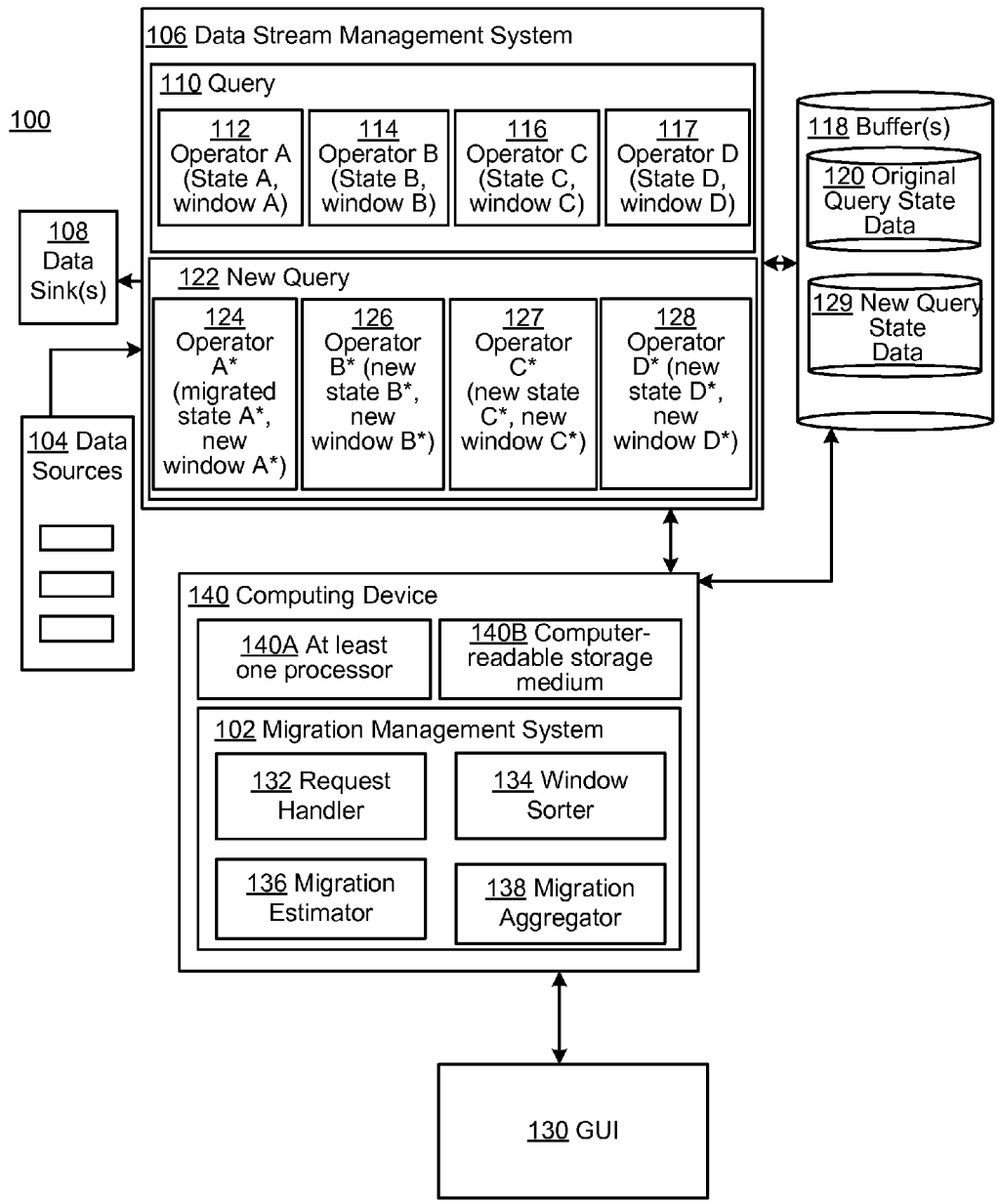
FIG. 1 is a block diagram of a system for performing multi-state query migration in a data stream management system.

FIG. 1 is a block diagram of a system 100 for multi-state query migration in data stream management systems. In the example of FIG. 1, a migration management system 102 operates in conjunction with data sources 104 and a data stream management system (DSMS) 106, which is itself designed to provide timely and accurate information to data sinks 108. More specifically, the migration management system 102 provides for estimation of a migration time associated with migrating an existing query 110 (including migration of associated state data as described below) to a new, modified query 122, during a runtime or execution/application of the query 110 against stream data received from the data sources 104. As described in detail below, the migration management system 102 may be configured to estimate a total migration time associated with the migration of the query 110 to the new query 122, even when the query 110 includes a plurality of heterogeneous operators and associated state data associated with arbitrary window sizes. In this way, for example, the migration management system 102 enables a user of the system 100 to make accurate and timely decisions regarding whether and how to implement query migrations associated with the data stream management system 106. Moreover, the migration management system 102 may initiate and implement such query migrations automatically, based on available system parameters (including, but not limited to, a throughput or system load of the system 100, a level of memory utilization of the system 100, and/or a level of accuracy of query results).

In FIG. 1, the DSMS 106 may represent a modified, conventional, or substantially conventional DSMS. For example, the DSMS 106 may be implemented in a distributed manner, e.g., using various nodes communicating by network, or may be implemented in a more centralized fashion. The DSMS 106 also may represent or otherwise be referred to using other known names, such as, e.g., business event processing system (BEPS), stream processing engine (SPE), or complex event processing (CEP). In any case, the DSMS 106 may be understood to represent any distributed or centralized system which receives or otherwise interacts with the stream data of the one or more stream data sources 104, where such stream data may be generally understood to represent a time series of data representing corresponding temporal events.

As referenced above, such data streams are known to exist in a variety of circumstances and settings, including, for example, business, industry, healthcare, government, or military settings. To give just a few, more specific, examples, the data sources 104 may output data streams representing or related to (events occurring within or with respect to) network monitoring, network traffic engineering, telecom call records, financial applications, stock market data, sensor networks, manufacturing processes, web logs and click streams, and massive datasets which are streamed as a way of handling the large volume of data. Such data streams may thus arise in enterprises, within and across government agencies, large science-related corroborations, libraries, battlefields, or "smart" homes.

The query 110 may represent a query that is pre-formulated during a design time for the system 100, and that includes a plurality of operators 112, 114, 116, 117 which execute in corroboration with one another (e.g., in a sequence in the example of FIG. 1) in order to execute the larger query. Of course, this is just a non-limiting example, and operators of the query 110 may execute in parallel to one another, or conditionally upon completion of prior operators, or in loops, or using any other known arrangement or collaboration. As referenced above, and as illustrated in the example of FIG. 1 and described in detail below, each of the operators 112, 114, 116, 117 may have corresponding state data associated therewith, and some or all such state data may need to be transferred in association with a migration to the new query 122.

Although in FIG. 1 the query 110 is illustrated as being part of the DSMS 106, it may be appreciated that the query 110 may be associated with (e.g., obtained from) a separate application, such as, for example, an enterprise resource planning (ERP) application, a customer relationship management (CRM) application, or an application for managing a warehouse, manufacturing facility, or other facility. As described below, such applications may be associated with, or represented by, one or more of the data sinks 108.

The query 110 may thus be received from the user or other system/service, and stream results of the application of the query 110 against the stream data of the sources 104 may be provided to the data sinks 108. Query 110 may be executed on stream data received from data stream sources 104, which is shown in FIG. 1 as being received at the DSMS 106.

As shown, at least some of the stream data may be stored in one or more buffers 118. For example, as is known, it is often useful to consider the stream data received from the data sources 104 using discrete windows. In this context, as referenced above, the term window may refer to a discrete, defined section or portion of the received data stream(s) over which, or against which, the user desires a query 110, or, more specifically, individual operators 112-117, to be evaluated. A window thus specifies a finite set of recent events, items, or other discrete elements (also sometimes referred to herein as "tuples" or "data tuples") from the otherwise-unbounded data stream.

This finite portion of the stream data may subsequently be evaluated using the query 110 to thereby produce results corresponding to a particular time period. Then, as time advances, fresh items/events may be included into the window at the expense of older tuples that stop taking part in computations (and, e.g., get discarded altogether). In general, windows may be desired to evolve in a prescribed mode keeping up with the continuous arrival of data items. For example, a simple window on a received data stream may specify "all the events in the last 10 seconds," "the most recent 10 events," or "all events occurring between an event of type 1 and an event of type 2." Aside from such simple examples, it may be appreciated that there are many types of windows which may be specified, and such windows may change or update over time or in response to some event or some other criteria.

Thus, it may be appreciated that each of the operators 112-117 of the query 110 may be associated with a corresponding window, and that data stored in association with each such window represents a current state of a corresponding operator. Thus, contents of at least some of the buffers 118 may represent such state information, including most recent values of the stream data received from the data sources 104 or intermediate results, if any, obtained through partial processing of the stream data by a subset of the operators 112-117. In many uses or instances of the system 100, as described herein, such collected values may represent valuable data.

For example, as referenced above, it may occur that the system 100 is implemented in conjunction with the manufacturing facility in which some consumer item (e.g., an automobile) is constructed for shipment. The system 100 may be used to optimize an operation of such a facility by, for example, predicting an imminent malfunction within the facility. In this way, repair or replacement of potentially faulty equipment may occur prior to an actual breakdown or other malfunction of such equipment, so that the downtime of the manufacturing facility is minimized.

For example, the data sources 104 may represent or include a plurality of sensors distributed within the manufacturing facility and configured to measure or otherwise sense some predefined operation or condition of the manufacturing facility. For example, such sensors may measure an operating temperature of the facility or of a particular piece of equipment therein, or may be configured to count a number of operations or uses of such equipment, or to detect an undesired operation of such equipment associated with an imminent failure thereof. Consequently, sensed data may be stored that may include valuable data relevant to predicting a possible imminent failure within the facility, such as abnormally high temperatures or other predictive events.

Further, during operations of the system 100, as referenced above, it may occur that the query 110 may be required to be migrated, and that a user of the system 100 may wish to estimate a migration time to the new query 122, e.g., in order to obtain more accurate, more complete, or more predictive results. For example, the window sizes of the various operators 112-117 may be changed, and/or an order or other characteristic(s) of the operators 112-117 may be required to be altered. Other examples of query modifications that may be associated with query migrations are referenced below, and/or would be apparent to one of ordinary skill of the art.

In general, though, it may be appreciated that during runtime of the system 100, a simple restart and/or re-initialization of the query 110 may be implemented in order to utilize the new query 122. That is for example, current values within the buffer 118 may be erased and new values may begin to be collected according to the new query. When a sufficient number of such values are collected, execution of a new query may begin/resume. Such an implementation, although possibly be useful in some contexts, may be problematic in situations such as those referenced above. For example, erasing the values within the buffers 118 may result in the loss of valuable information useful in predicting the possible failures within the manufacturing facility (such as the temperature fluctuations mentioned above). In taking the time to recollect new data values, the failure that otherwise would have been predicted may occur, thereby rendering the need for the query modification moot, and occurring delays, expenses, and other difficulties for the manager of the manufacturing facility. Moreover, such conventional approaches render it difficult or impossible to provide continuous output of query results, even if desired by a user.

Thus, as referenced above, the data stream management system 106 may be configured to migrate the query 110 to the new query 122, and may continue to process the query 110 and associated state data until such time as the new query 122 has accumulated or otherwise obtained sufficient state data to proceed with processing of the data sources 104, at which time the query 110 and the associated state data may be deleted or discarded. Such query migrations thus attempt to provide for uninterrupted service/operation of the system 100, and thereby decrease downtime of the system 100 and the underlying facility/location (e.g., the manufacturing facility in the example above), without sacrificing data or analysis thereof. Meanwhile, the migration management system 102 may be configured to estimate or predict a migration time and/or other configuration parameters for such potential migrations, to thereby enable a user of the system 100 to conduct actual migrations in a desired, predictable fashion.

More specifically, as shown, the system 100 may include execution of the data stream management system 106 including storage of query state data 120 using the buffers 118. As may be understood from the above description, the query state data 120 thus represents separate, discrete datasets corresponding to the individual states and associated window sizes of the operators 112-117. As shown in FIG. 1, as a matter of notation, the operators 112, 114, 116, 117 may be referred to as, respectively, operator A, operator B, operator C, and operator D, which may therefore be understood to have respective states A, B, C, D, as well as associated, respective window sizes A, B, C, D.

Meanwhile, the new query 122 may be understood to have its own operators 124, 126, 127, 128, each of which may have its own corresponding state data and associated window size. As with the query 110, the buffers 118 may include storage of new query state data 129, which, similarly to the original query state data 120, may be used to store separate, discrete datasets corresponding to the states and window sizes of the operators 124-128. Again, as a matter of notation, as shown in FIG. 1, the new operators 124, 126, 127, 128 may be referred to respectively as new operator A*, new operator B*, new operator C*, new operator D*, having respective states A*, B*, C*, D* and window sizes A*, B*, C*, D*.

Thus, for example, the new operator 124 may be understood to be a modified version of the operator 112 of the query 110, while the new operator 126 may be understood to be a modified version of the operator 114, and so on with respect to operators 116, 117 and corresponding new operators 127, 128. As described, the new query 122 may execute, at least initially, in parallel with the query 110, and ultimately the new query 122 may replace the query 110 without loss of the state data of the query 110.

It may be appreciated that the new query state data 129 may correspond to requirements of the new query 122 and/or the new operators 124-128 thereof. For example, as referenced above and herein below, it may occur that the new query 122, and the operators 124-128, may be associated with a longer/larger window(s) of data than that of corresponding operators of the query 110. In this case, in addition to duplicating the original query state data 120, the data stream management system 106 may modify a size of the buffer 129 relative to the buffer 120 (or portions thereof), so as to accommodate the specified larger window sizes, i.e., in this example, collecting and keeping more data before deleting prior-received data.

As referenced above and described in detail below, the migration management system 102 may enable manual or automatic estimation of a total migration time associated with migrating the query 110 to the new query 122, while maintaining output of query results from the query 110 until the migration is complete. Moreover, the migration management system 102 may provide for such estimation of total migration time, even in the presence of heterogeneous operators 112-117 having arbitrary window sizes and associated quantities of state data.

Specifically, in the example of FIG. 1, a graphical user interface (GUI) 130 may be utilized by a user of the system 100 to access the migration management system 102, and thereby obtain a desired estimate of a total query migration time. Accordingly, as shown, the migration management system 102 may include a request handler 132 which may be configured to receive requests from the GUI 130 which specify a particular query and associated query migration which is to be estimated.

As described in detail below, the migration management system 102 may include a window sorter 134 which may be configured to sort the new windows A*, B*, C*, D* based on a size thereof, relative to one another. More specifically, for example, the window sorter 134 may be configured to sort the windows A*, B*, C*, D* in an order from longest time-based window size to shortest time-based window size.

Then, a migration estimator 136 may be configured to estimate a migration time of each individual state and associated window in a step-wise fashion, beginning with the first, longest, new window size. As described in detail below, each such successive estimation of a given migration time for a given state and associated window size may take into account the previously-obtained estimate for the migration time(s) of preceding state(s) and associated window size(s). In this way, estimations for migration times of individual states and associated window sizes may be obtained in an iterative fashion, proceeding from the longest to the shortest window size, and taking into account the state transfers of preceding iterations, until such time as all states are processed, or until such time as it is determined that estimated migration times of preceding iterations encompass or include migration times associated with any remaining migrations of remaining states and associated windows.

Once all necessary migration times for individual states have been estimated, a migration aggregator 138 may be configured to aggregate the thus-obtained individual migration times. In this way, the migration aggregator 138 may be configured to provide a total migration time, and/or associated state data values, for migration of the query 110 to the new query 122.

Further examples and explanation of features and operations of the system 100 of FIG. 1 are provided below with respect to FIGS. 2-6. However, it may be appreciated that such examples and explanations are non-limiting, and are merely for the sake of example and/or illustration. Consequently, many details of such implementations are not described in detail herein, to the extent that such details would be apparent to one of skill in the art. Similarly, many variations of the example implementations described herein also would be apparent to one of skill in the art.

For example, in the example of FIG. 1, the migration management system 102 is illustrated as executing on a computing device 140, utilizing at least one processor 140A and computer readable storage medium 140B. In the illustrated example, the migration management system 102 may execute separately but in conjunction with the data stream management system 106. Of course, in various examples, the DSMS 106 and buffers 118 may execute on the same computing device 140 as the migration management system 102, or on one or more separate, distributed computing devices, not specifically illustrated in the example of FIG. 1, which may be in communication with the computing device 140. For example, in such distributed computing scenarios, migrations of state data between network nodes are associated with corresponding transfer times which depend on network characteristics and conditions. Nonetheless, the various features and function of the migration management system 102 enable the use of such state data and continuous output of query results as described herein, even in these contexts. In other example implementations, the migration management system 102 may be incorporated in, e.g., integrated with, the DSMS 106.

Figure 2:
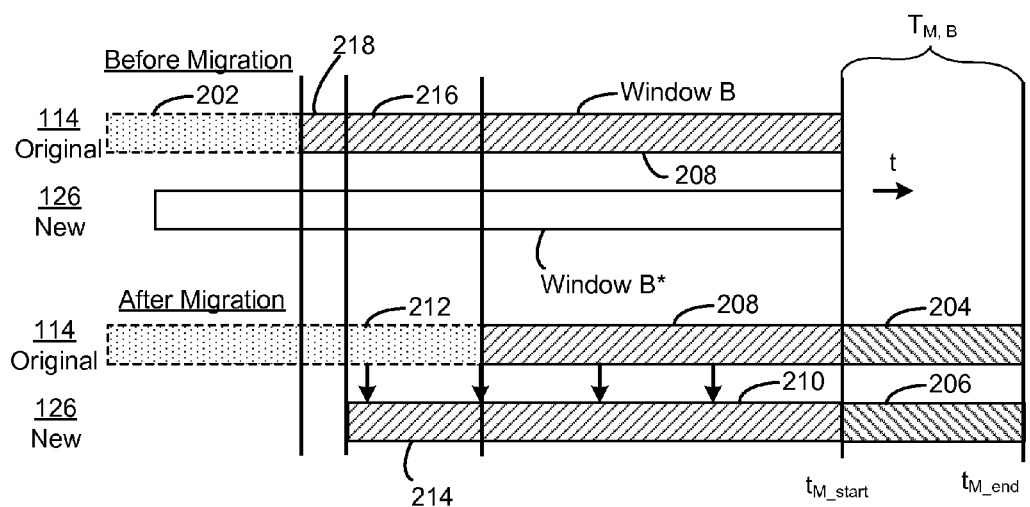
FIG. 2 illustrates state transfer during a query migration of one operator of the system of FIG. 1.

FIG. 2 illustrates an example state transfer that may be executed by the DSMS 106, where, as described above, a migration time associated with the illustrated state transfer may be preemptively estimated by the migration management system 102, i.e., by the migration estimator 136. In the example of FIG. 2, migration is illustrated for the migration of the operator 114 to the operator 126. That is, as may be understood from the above description, the illustrated migration describes and includes migration of state data associated with an existing window size of the operator 114 to a new operator 126 with an associated new window size (which also may be referred to or described as a target window size). Although the example of FIG. 2 is illustrated with respect to the migration between operators 114, 126, it may be appreciated that similar description applies to individual instances of the various other state transfers associated with operators 112, 116, 117 and respective new operators 124, 127, 128.

Thus, in the example of FIG. 2, in a time before a beginning of migration, it may be observed that the original operator 114 includes a window B which includes existing or old state data values. As shown, the window B is of a certain size or duration, and, as illustrated in portion 202, any state data values which are older than a size of the window B may be discarded or deleted.

Meanwhile, the new operator 126 may be designed by a user of the DSMS 106 to include state data values accumulated within a window B* which, as illustrated, may be longer than the original window B of the operator 114. As may be observed from the example, it may be impossible to transfer sufficient data values to completely fill the new window B*, at least in part because of the discarded values of the portion 202.

At a time illustrated as $t_{M\_start}$, migration may begin to occur. That is, as described above, FIG. 2 contemplates the situation in which a user of the DSMS 106 wishes to continue processing the original query 110, i.e., the operator 114 in the example of FIG. 2, during the migration to the operator 126. That is, the user of the data stream management system 106 may wish to continue to accumulate original query state data 120 and to process the accumulated data to provide results to the data sinks 108. At the same time, the user of the DSMS 106, in the example, may wish to transfer the original query state data 120 to the new query state data 129, in conjunction with also simultaneously accumulating newly arriving data which is processed simultaneously by the operators 114, 126 during the migration in question.

Thus, as illustrated, a migration time $T_{M,B}$ for the migration of the state data of the operator 114 to the new state data of the migrated operator 126 may be understood to include the time period between the start of the migration $t_{M\_start}$ until an end time of the migration $t_{M\_end}$. As may be observed, the migration time $T_{M,B}$ may thus be understood to represent a minimum time necessary to completely fill the new, window B* with old/transferred values as well as newly acquired values.

In detail, as illustrated, at a time $t_{M\_start}$, new values 204 continue to be collected and processed by the operator 114 from within the original state data 120, in conjunction with existing, previously collected state data values in a portion 208 of the window B. Thus, at a time of the end of the migration $t_{M\_end}$, the window B may be observed to include the new values 204 and the previously accumulated values 208, while values in a portion 212 have been discarded or deleted, analogously to values in the portion 202 prior to beginning of the migration.

Meanwhile, as also illustrated, equivalent or identical new values 206 may be accumulated by the new operator 126 within the window B*, while a portion 210 includes transferred state data values from the portion 208 of the window B. Meanwhile, a portion 214 of the window B* may include transferred data values from a portion 216 of the original window B. In other words, the state data values of the portion 214 of the new window B* may be considered to have been transferred from the portion 216 prior to the discarding of the data values thereof as illustrated by the portion 212. As may also be observed, the original window B may include a portion 218 which includes state data values which do not need to be transferred as part of the illustrated migration.

In general, it may be appreciated that the state transfer illustrated in the example of FIG. 2, and similar state transfers, may consume a finite amount of time to complete. At the same time, as shown and described, the operator of the DSMS 106 may wish to continue processing new values for both the original and new operators, so as to continue to provide query results to the data sinks 108 during the migration. Consequently, in the examples that follow, it is assumed that the described state transfer operations are designed by the DSMS 106 to occur at least partially during idle times of the DSMS 106, and with a lower priority then the regular, normal query processing of the DSMS 106.

In other words, as described in detail below, it is assumed that the DSMS 106 processes events received from the data sources 104 in a periodic or aperiodic fashion, in which, e.g., data values are received and/or processed as they arrive and/or in a batch fashion during active system processing times, while the data stream management system 106 otherwise remains idle. Then, as just referenced, the actual state data value transfers (e.g., the transfer of data values from the portion 208 to the portion 210 in the example of FIG. 2) may occur during such idle times.

As a result, during each cycle of system idle time followed by system processing time, a certain subset of the state data values may be transferred (e.g., a certain subset of the portion 208 may be transferred to the portion 210), and during each system processing time, new values may be collected to populate a subset of the portions 204, 206. Thus, over a sufficient number of such cycles of idle time and system processing time, an entirety of the migration time $T_{M,B}$ may be understood to occur.

Using these and additional or alternative assumptions regarding operations of the DSMS 106 in conducting the migration 110 to the new query 122, the migration estimator 136 may be configured to estimate the total migration time $T_{M,B}$ for the individual state B and associated window B, and the migration of state data values thereof to the new state B* and the corresponding new window B*. Detailed examples and associated equations for calculating the migration time $T_{M,B}$ for an individual state are provided below with respect to FIGS. 5A-5C and FIG. 6.

Thus, FIG. 2 illustrates an example of state transfer that provides a basis for understanding the more detailed example operations of the migration management system 102 described below with respect to FIGS. 3A-3C and FIGS. 4-6. In so doing, FIG. 2 particularly illustrates certain operations of the migration estimator 136 related to estimating the migration time $T_{M,B}$ of the individual state of the individual operator 114 being migrated to the new operator 126.

Figure 3A:
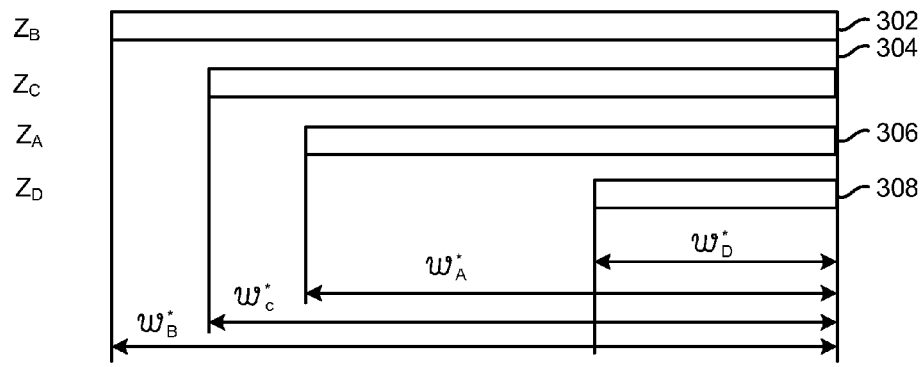
FIGS. 3A-3C illustrate an ordered transfer of state data, and associated estimations of a total migration time, for a plurality of states transferred using the system of FIG. 1.
Figure 3B:
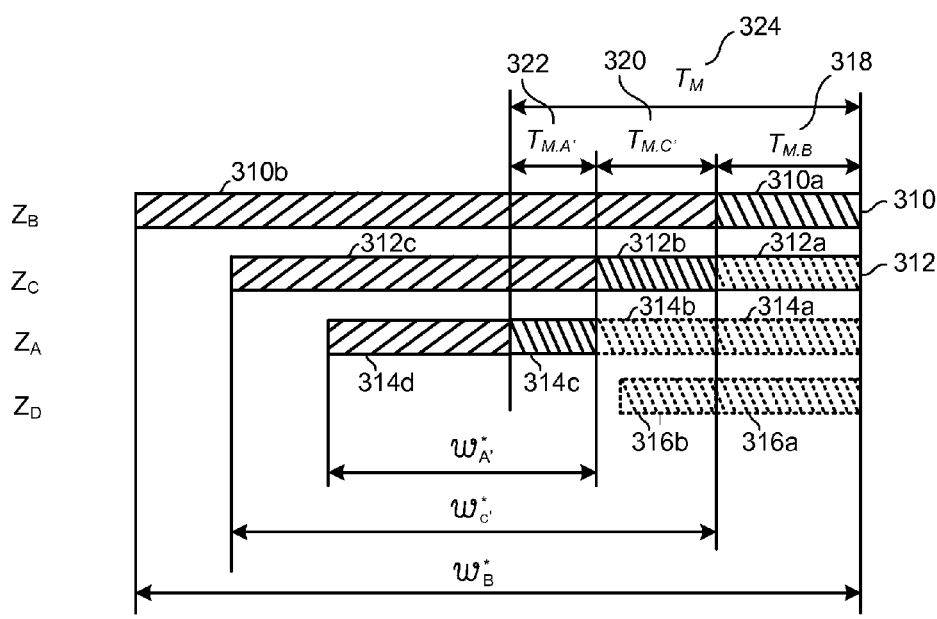
Figure 3C:
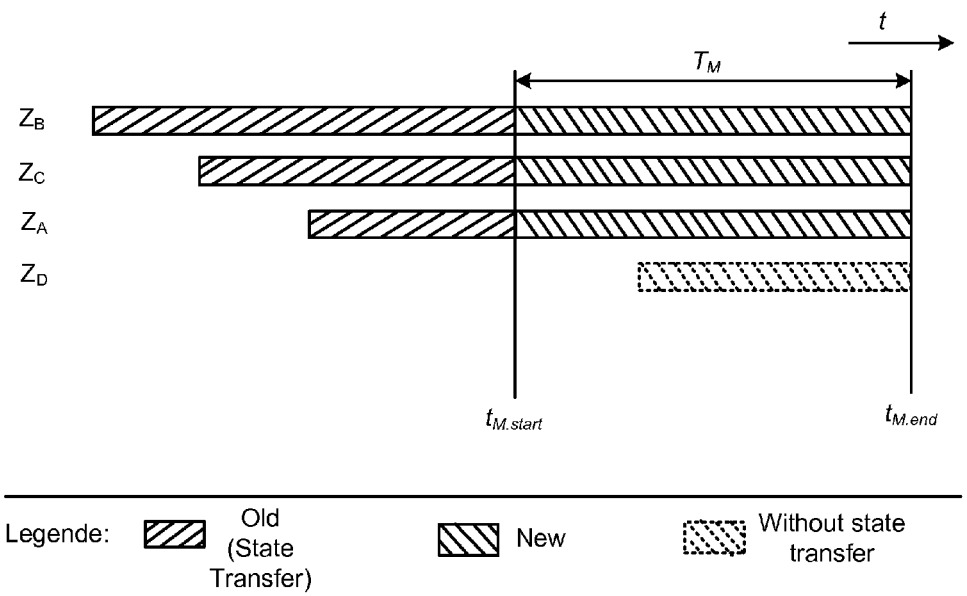

Meanwhile, as described in detail below, FIG. 3A illustrates example operations of the window sorter 134 of the migration management system 102. As just referenced, FIG. 3B illustrates example operations of the migration estimator 136, e.g., including the state transfer operations described with respect to FIG. 2 but executed in the context of utilizing results outputted from the window sorter 134. Then, FIG. 3C illustrates example operations of the migration aggregator 138 in leveraging operations of the window sorter 134 and the migration estimator 136 to estimate a total migration time for migration of the query 110 to the new query 122.

More specifically, FIG. 3A illustrates example operations of the window sorter 134 in sorting the windows A*, B*, C*, D* of the corresponding new operators 124, 126, 127, 128 of the new query 122. Specifically, as referenced above with respect to the window sorter 134 and as illustrated in the example of FIG. 3A, the window sorter 134 may be configured to sort the time-based window sizes from longest to shortest window size.

In the illustrative example provided for the sake of explanation, it is assumed that a window 302 corresponding to the window B* and notated in FIG. 3A with the time-based window size $w^*_B$ is the longest window of the new operators 124-128 of the new query 122. Also by way of notation, as shown, the corresponding state for the new operator 126 is notated in FIG. 3A as $Z_B$.

Similarly, as shown, a window 304 corresponds to a next-longest window, and, specifically, corresponds to the window C*, notated in FIG. 3A with the time-based window size $w^*_C$ and corresponding to the new state of the new operator 127, notated in FIG. 3A as $Z_C$. Further, a next-longest window 306 corresponds to the new window A*, and is notated in FIG. 3A with the time-based window size $w^*_A$ corresponding to new state $Z_A$ of the new operator 127. Finally in FIG. 3A, a next-longest window, i.e., the shortest window in the example, is illustrated as a window 308 corresponding to new window D*, notated in FIG. 3A with the time-based window size $w^*_D$ corresponding to state $Z_D$ of the new operator 128.

Thus, FIG. 3A illustrates operations of the window sorter 134 in sorting new states by their corresponding window sizes, and, specifically, by sorting the window sizes from longest to shortest ($w^*_B > w^*_C > w^*_A > w^*_D$). In the example of FIG. 3A, it is assumed that the various window sizes are measured and expressed in units of time, e.g., in seconds, minutes, hours, or days. In some implementations of the DSMS 106, however, windows may be measured in terms of events, rather than in terms of duration. In such implementations, it may be necessary to convert the number of events corresponding to a given window into a corresponding duration of time, prior to execution of the above described operations of the window sorter 134. More specific examples of such conversions and operations of the window sorter 134 are provided below, e.g., with respect to FIGS. 4 and 6.

Subsequently, in the example of FIG. 3B, the migration estimator 136 may begin operations by estimating a migration time associated with the state $Z_B$ of the new operator 126, according to the techniques described above with respect to FIG. 2. That is, with reference to FIG. 2 it may be observed that a new window 310 corresponds to the window B* of FIG. 2, and includes a portion 310a corresponding to the portion 206 of FIG. 2, and a portion 310b corresponding to portions 210-214 of FIG. 2. In other words, as shown, the operations of the examples of FIG. 2 may be understood to be executed in the context of FIG. 3B, to collect new values within the portion 310A corresponding to a migration time for the individual state $Z_B$ of the new operator 126, so that such an individual state migration time may be represented in FIG. 3B by the notation $T_{M,B}$ 318. Thus, again, it may be recognized that operations of the migration estimator 136 with respect to the new window 310 of size $w^*_B$ in calculating the migration time $T_{M,B}$ are exactly analogous to the operations of FIG. 2 in calculating the corresponding parameter $T_{M,B}$ therein.

Subsequently, the migration estimator 136 may proceed to execute conceptually similar calculations with respect to estimating a migration time of the next-longest window, i.e., the window 304 of size $w^*_C$ associated with the state $Z_C$ of the new operator 127. However, in so doing, and as illustrated in FIG. 3B, the migration estimator 136 takes into account that the new window 312 corresponding to the state $Z_C$ in the example of FIG. 3B includes a portion 312a which includes new values already collected during the migration of state data values in the context of the window 310 associated with the state $Z_B$.

As may be observed from the illustration, the collection of new state data values within the window 312 and within the portion 312a effectively reduces a window size of the window 304, for purposes of estimation, from the size $w^*_C$ to the size $w^*_{C'}$, as shown in the context of the new window 312 in the example of FIG. 3B. Thus, as explained in detail below with respect to FIG. 6, the migration estimator 136 may proceed to repeat the calculation of the migration time previously performed with respect to the window 310, but in the context of the window 312 in using the reduced window size $w^*_{C'}$. As a result, the migration estimator 136 may determine a portion 312b corresponding to the portions 204, 206 in the example of FIG. 2, as well as a portion 312C corresponding to portions 214/210 of FIG. 2. In this way, the migration estimator 136 may estimate a migration time $T_{M,C'}$ 320.

The migration estimator 136 may then proceed to perform similar calculations with respect to a window 314 corresponding to the state $Z_A$ being migrated to the operator 124. As may be understood from the above description of the window 312, the window 314 may include the portion 314a corresponding to new values collected during the migration of the state data values associated with the window 310 and the state $Z_B$, as well as a portion 314e corresponding to new state data values collected during the transfer of state data values associated with the window 312 and the state $Z_C$. Therefore, the migration estimator 136 may proceed to execute the calculations of FIG. 2 with respect to window 314, but using a reduced window size $w^*_{A'}$, which is reduced by an amount corresponding to a sum of the durations of the portions 314a, 314b (i.e., 318, 320). As a result, a portion 314c may be determined corresponding to the portion 206 in FIG. 2, while a portion 314d may be estimated corresponding to the portions 214/210 of FIG. 2, so that a corresponding migration time $T_{M,A'}$ 322 may be calculated for the window 314 and the state $Z_A$ of the modified operator 124.

At this point, it may be observed with respect to the window 316 corresponding to the state $Z_D$ of the new operator 128 that portions 316a and 316b represent newly collected state data values accumulated within the window 316 during the previous migrations. In other words, it may be observed that, due to the relative shortness of length of the window 316 relative to the windows 310-314, the preceding migration times 318-322 provide more than sufficient time for the window 316 to accumulate all necessary state data values needed to fully populate the window 316. Consequently, no further migration time associated with the window 316 is required to be calculated.

FIG. 3C illustrates example operations of the migration aggregator 138 in determining a total migration time $T_M$. Specifically, as shown, the total migration time $T_M$ 324 may be understood as simply as summation of the individual migration times 318, 320, 322. As shown, and as just described, the total migration time 324 includes all necessary migration times needed to complete the migrations of the states associated with the new operators selected for migration 124-128. Thus, in this way, the migration management system 102 may be configured to provide a fast estimation of total migration time for an automatically performed migration or to a user of the system 100, e.g., by way of the GUI 130, even in situations where the operators 124-128 include multiple states and associated windows of arbitrary size.

Figure 4:
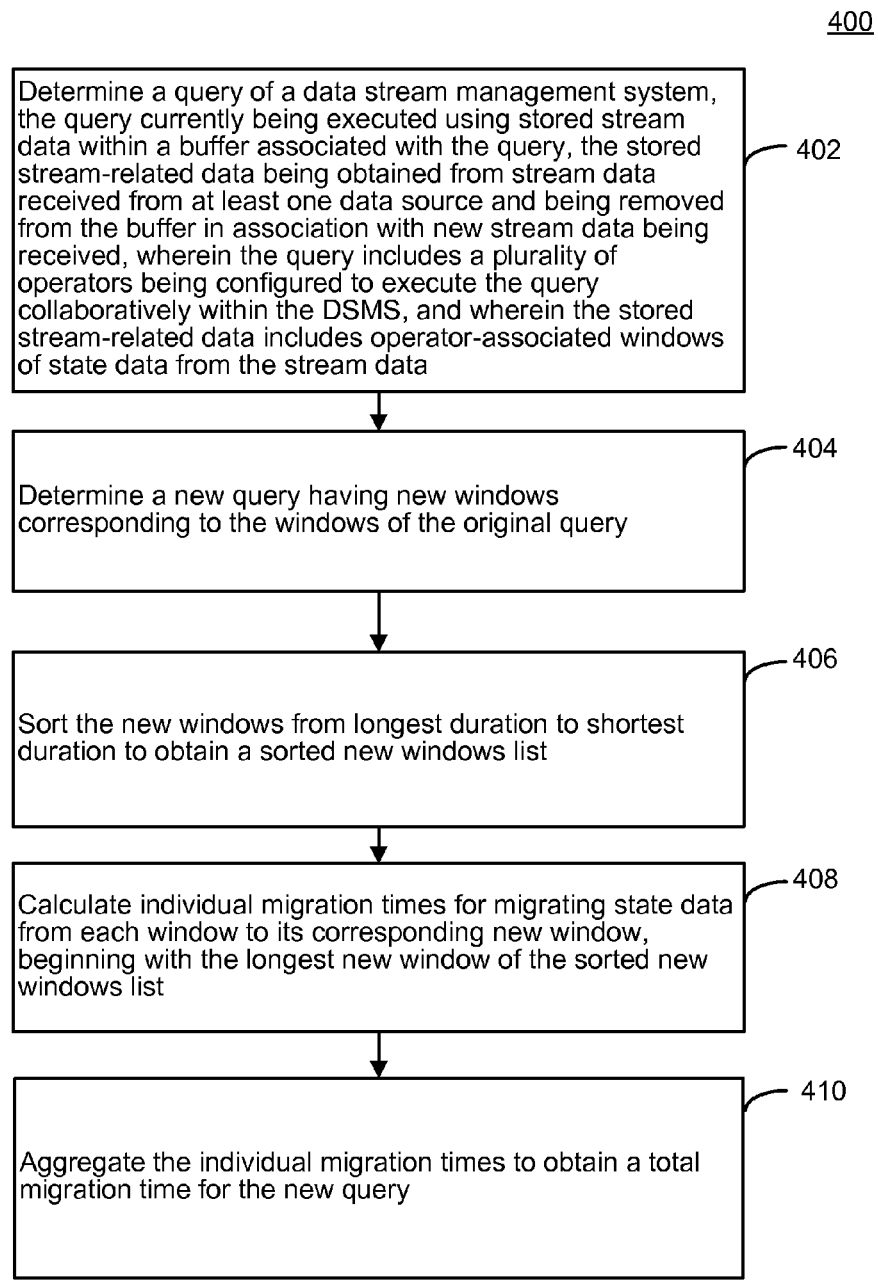
FIG. 4 is a flowchart illustrating example operations of the system of FIG. 1.

FIG. 4 is a flowchart 400 illustrating example operations 402-410 of the system 100 of FIG. 1. In the example of FIG. 4, operations 402-410 are illustrated as separate, sequential operations. However, it may be appreciated that additional or alternative operations may be included, and/or that any or all such operations may be performed in a different order than that shown. For example, operations may be performed in a partially or completely overlapping or parallel manner, or may be performed in a nested, iterative, or looped fashion.

In the example of FIG. 4, a query of a data stream management system may be determined, the query currently being executed using stored stream-related data within a buffer associated with the query, the stored stream-related data being obtained from stream data received from at least one data source (including, e.g., by processed stream data received by way of a preceding operator) and being removed from the buffer in association with new stream data being received, wherein the query includes a plurality of operators being configured to execute the query collaboratively within the DSMS, and wherein the stored stream data includes operator-associated windows of state data from the stream data (402). For example, the request handler 132 may be configured to receive a request from the GUI 130, where such a request may identify the query 110 in which the operators 112-117 execute against events arriving from the data sources 104, and for which associated state data is stored in the buffers 118 using the original query state data store 120, as described above.

A new query having new windows corresponding to the windows of the original query may be determined (404). For example, the request handler 132 may be further configured to identify the new query 122 based on information provided by a user of the system 100 by way of the GUI 130. As illustrated and described, the new query 122 may include corresponding new operators 124-128, where each such operator may be associated with corresponding states and state data values defined by corresponding new windows. In the example of FIG. 1, the new states of the new query 122 are illustrated as being in a one-to-one relationship with the corresponding modified operators 124-128. However, it may be appreciated that such examples are merely for the sake of illustration, and that, in other example implementations, the state data may not have corresponding relationships to relevant operators. Similarly, it may occur that not all state data of all operators may need to be transferred as part of the migration.

The new windows selected for migration may be sorted from longest duration to shortest duration to obtain a sorted new windows list (406). For example, as described with respect to FIG. 3A, the window sorter 134 may be configured to sort the new windows 302-308 in the illustrated order, corresponding to the described arrangement from longest duration to shortest duration. As referenced herein, in the scenarios in which the new windows are expressed in terms of event counts rather than in durations, it may be necessary to convert the count-based window size into a time-based window size. In many cases, such conversions may be implemented in a straightforward manner by the window sorter 134, prior to conducting the sorting operation described herein. In some cases, however, it is not straightforward and the time-based window size may be estimated, for example, it may occur that a filter is supplied by a corresponding operator of the query 110 in implementing a count-based window size. That is, for example, such a filter may remove one or more events from being included within a corresponding window, in which case the removal of such elements must be considered when converting the count-based window size into a time-based window size, or, in some cases, an estimated time-based window size.

Individual migration times for migrating state data from each window to its corresponding new window may be calculated, beginning with the longest new window of the sorted list of new windows (408). For example, as described above with respect to the migration estimator 136 of FIG. 1, and with respect to FIGS. 2 and 3B, the migration estimator 136 may be configured to calculate a migration time $T_{M,B}$ with the state $Z_B$ as illustrated by the new window 310 in FIG. 3B.

As also described above, in an example implementation, the migration estimator 136 may iteratively proceed with calculating each successive migration time associated with each successive new window of the sorted windows list, taking into account the effects of previously-calculated migration times associated with preceding new windows of the sorted new windows list. That is, for example, the migration time associated with the new window 312 and expressed as migration $T_{M,C'}$ 320 is calculated using the reduced window size $w^*_{C'}$ which is reduced relative to the original window size $w^*_C$ of the window 304 by an amount equivalent to the migration time $T_{M,B}$ 318 associated with the new window 310 of the state $Z_B$.

Similarly, the migration time $T_{M,A'}$ 322 may be calculated taking into account the previously-determined migration times $T_{M,B}$ 318 and $T_{M,C'}$ 320. That is, the migration time $T_{M,A'}$ 322 may be calculated using the reduced window size $w^*_{A'}$, which is reduced relative to the original window size $w^*_A$ of the new window 306 by an amount equivalent to a summation of the previously-determined migration times $T_{M,C'}$ 320 and $T_{M,B}$ 318. As referenced above, and as described in detail below with respect to FIG. 6, such calculations of the migration estimator 136 may continue until a new window of the sorted new windows list is reached which has already been filled by state data values which have newly arrived during the previous migration times 318-322, or until no windows remain in the sorted new windows list.

The individual migration times may be aggregated to obtain a total migration time for the new query (410). For example, the migration aggregator 138 may be configured to aggregate the migration times 318-322 in order to obtain a total migration time 324, as shown above with respect to FIGS. 3B and 3C.

As referenced herein, operations of the flowchart 400 may overlap or may occur in conjunction with one another. For example, as described in detail below with respect to FIG. 6, it may occur that operations 408 and 410 may occur in conjunction with one another, since individual migration times 318-320 may be aggregated with previous migration times in conjunction with each successive consideration of new windows of the sorted migration windows list by the migration estimator 136. In other words, as shown, the migration aggregator 138 may execute on an "as you go" basis during operations of the migration estimator 136. As a result, as described herein, the migration management system 102 may be configured to estimate the total migration time 324, and to derive the amount of new data values and state transfer values for all involved states, so that an operator of the system 100 may be quickly and accurately informed regarding such details of potential query migrations, and may operate the DSMS 106 based on such information.

Figure 5A:
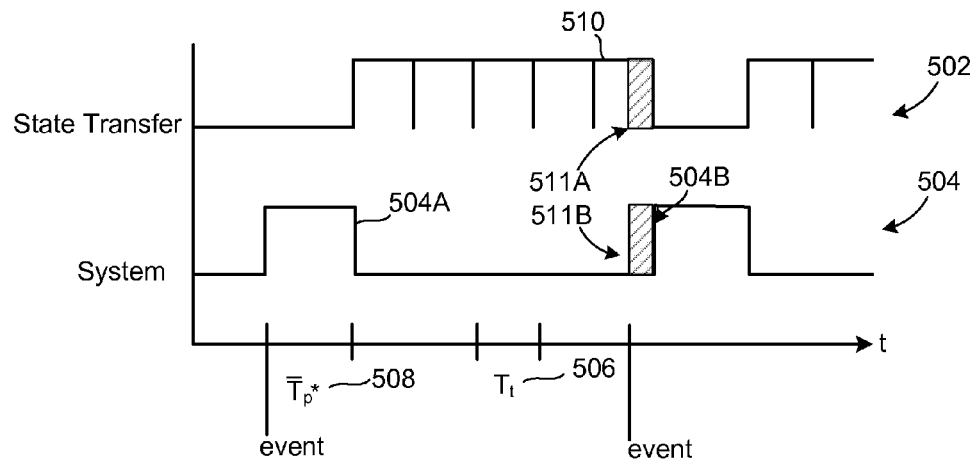
FIGS. 5A-5C illustrate alternatives to handle collisions of state transfer with DSMS activities which influence the estimation of a number of state data values of a state to be migrated during an idle time of a data stream management system.
Figure 5B:
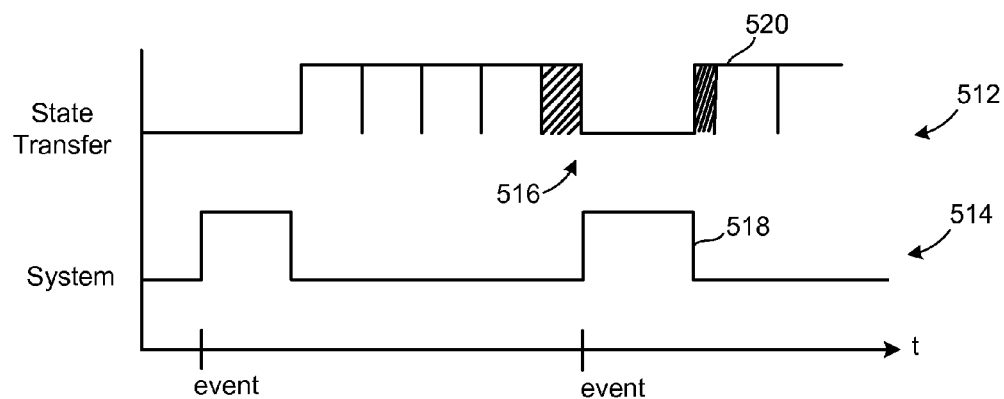

FIGS. 5A and 5B illustrate more detailed example implementations associated with executing an individual state transfer, such as may occur, for example, in the context of FIG. 2, e.g., with respect to a transfer of state data values between portions 208 and 210 of FIG. 2 and/or with respect to collection of new data values within portions 204/206. Specifically, as referenced above with respect to FIG. 2, it may occur that the DSMS 106 executes by alternating between idle times and processing times. That is, during normal processing of the query 110, the DSMS 106 may experience idle times during which no state data values are collected and/or processed, as well as processing times in which data values from the data source 104 are received, stored in the states, and/or processed.

Since, as described, it is a goal of the system 100 to continue to provide query results to data sinks 108 even during the migration of the query 110 to the new query 122, and to do so with a high priority so that the data sinks 108 may continue to receive query results at a normal or close to normal rate during the query migration, the DSMS 106 may be configured to conduct the actual state data value transfers (e.g., from the portion 208 to the portion 210) during idle times of the DSMS 106. Consequently, it may occur that the DSMS 106 may attempt to transfer a state data value from the portion 208 to the portion 210, and, before being able to complete the corresponding data value transfer, may be interrupted by a collision with a commencement of a system processing of the query 110 (and/or the new query 122) by the DSMS 106. Therefore, FIGS. 5A and 5B illustrate example considerations related to the possibility of such collisions between state data value transfers and the active system processing times of the DSMS 106.

In particular, with respect to the example of FIG. 5A, a state data value transfer 502 is illustrated in which individual state data values are transferred during an idle time which exists with respect to system processing times 504. Specifically, as shown, an average system processing time $T_p^*$ 508 may be represented by time periods 504A, 504B, so that an average system idle time may correspondingly be represented as existing between times 504A, 504B (i.e., between a falling edge of 504A and a rising edge of 504B). As shown, a transfer time $T_t$ 506 may exist which represents the finite amount of time required to transfer a single state data value, e.g., from the portion 208 to the portion 210 of FIG. 2. The transfer time may include the processing of the transferred value.

In the examples described herein, a cycle of the system processing times 504 may be defined as a combination of the idle time and a corresponding preceding or subsequent processing time. In this regard, it may be appreciated that the average system processing times 504A, 504B need not occur in a regular or periodic fashion, and may not have regular or periodic or predictable durations. Thus, in the examples that follow, calculations of individual state transfers such as may be performed as in the example of FIG. 2 above are described with respect to an average idle time that may occur over a number of such processing cycles, and/or with respect to an average system processing time and/or an average time between events/arrivals. As a result, the number of event counts which may be transferred during system idle times may also be determined on an average basis. Therefore, an average system idle time may be defined relative to the total average cycle minus the average processing time, i.e., according to Equation 0:

$$\overline{T}_i = \overline{T}_{syst} - \overline{T_p^*} \qquad \text{Equation 0}$$

In such scenarios, as referenced above, it may be observed that collisions between attempted state data value transfers and a commencement of a new system processing time may occur. Thus, FIGS. 5A-5C provide specific example methods for considering such collisions when calculating a migration time $T_M$ of an individual state, such as described above with respect to FIG. 2.

In particular, in the example of FIG. 5A, a state data value 510 to be transferred may begin a transfer, but may collide with an arrival of a new value from the data sources 104, and associated processing, conducted during system processing time 504B. The resulting collision is illustrated in the example of FIG. 5A by hatched areas 511A, B. Specifically, in FIG. 5A, a rising edge of area 511B represents an arrival of an incoming event. However, in the example of FIG. 5A, the processing of regular values is delayed for an amount corresponding to the hatched area 511A, to thereby permit completion of the state data value transfer of the state data value 510. Thus, in the example of FIG. 5A, as described in more detail below with respect to Equation 1—Scenario A, an average number of state data values that may be transferred during the average system idle time may thus be represented on an floating point basis. Specifically, in the example of FIG. 5A, the example illustrates that 5 full state values may be transferred, at the cost of the delay in processing represented by hatched area 511B.

In FIG. 5B, an interrupted state transfer is illustrated in which state transfer times are illustrated with respect to system processing times 514. A state data value 516 may begin transfer and may be interrupted by arrival of an incoming event, represented by a rising edge of area 518. Then, in FIG. 5B, the state data transfer is paused and then re-commenced upon completion of processing associated with area 518. Thus, an area 516 representing the pre-interruption amount of state data transferred together with an area 520 representing a post-interruption amount of state data transferred together equal a full state data value transfer. Thus, in such cases and as described in more detail below with respect to Equation 1—Scenario A, state transfers may be calculated on a floating point basis, since fractional transfers may occur within each idle time.

Figure 5C:
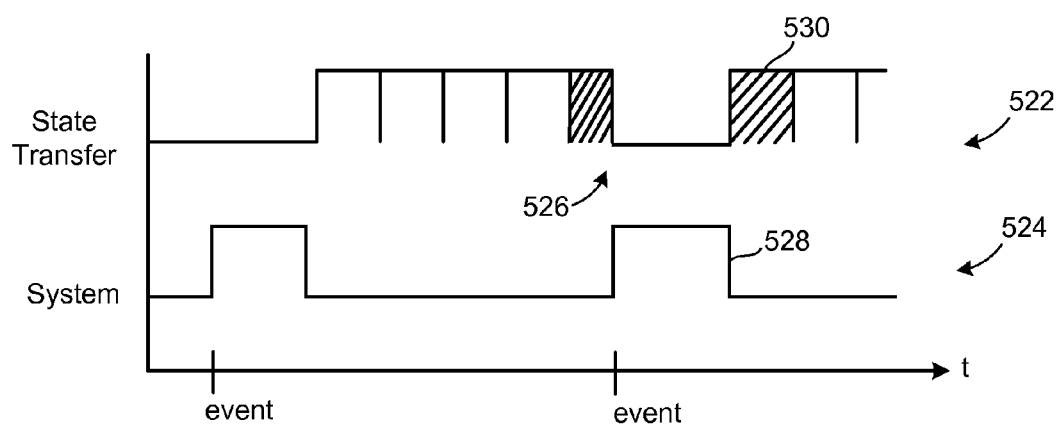

In the example of FIG. 5C, an example is illustrated in which state transfer times 522 are illustrated with respect to system processing times 524. In the example of FIG. 5C, as in the examples of FIG. 5A,B, it may occur that a state data value 526 to be transferred may be in the process of being transferred when system processing time 528 commences. In the example of FIG. 5C, the transfer of the state data value 526 may be halted or aborted, so that, for example, any transferred portion thereof may be deleted or discarded. Then, upon ending of the system processing time 528, the transfer of the state data value 526 may be recommenced as a transfer of the same state data value from a beginning point thereof, illustrated in the example of FIG. 5C as state data value 530. As described in detail below with respect to Equation 1—Scenario B, FIG. 5C thus illustrates an alternative implementation for calculating an average number of state data values that may be transferred during an average idle time of the DSMS 106.

Thus, as may be appreciated from the above, Equation 1 may be presented in alternative form with respect to either scenarios A, B of FIGS. 5A, 5B, or scenario B of FIG. 5C, as shown:

Equation 1

$$N_t = \overline{T}_i / (T_t + T_P) \qquad \text{Scenario A}$$

$$N_t = \text{floor}[\overline{T}_i / (T_t + T_P)] \qquad \text{Scenario B}$$

Thus, as seen in scenario A of Equation 1, corresponding to FIGS. 5A and 5B, an average number of state data values $N_t$ that may be transferred during an average idle time $\overline{T}_i$ may be expressed by the relationship of the average idle time $\overline{T}_i$ to the summation of the transfer $T_t$ of a single tuple or state data value and a corresponding processing time $T_p$. As described above with respect to FIG. 5A, 5B, the value of the average number of values that may be transferred during the average idle time, expressed as $N_t$ in scenario A of Equation 1 may be expressed as a fractional or floating point value, e.g., as approximately 4.7 state data values, as may be observed from the example of FIG. 5A, 5B. In contrast, the average number of values $N_t$ that may be transferred during the average idle time in the "abort and restart" scenario of FIG. 5C must always be expressed as an integer value (e.g., exactly 4 state data values), since any fractional portion of transfer state data values are discarded in the example scenario B of FIG. 5C, as illustrated by the use of the floor function of scenario B of Equation 1. Thus, it may be observed that for FIGS. 5A and 5B, essentially the same transfer has been completed within a corresponding amount of time. In contrast, in FIG. 5C, more time is required because the portion transferred prior to the event arrival is discarded and the entirety of this value's transfer is repeated from the beginning after system processing completes.

Moreover, it may be appreciated that these scenarios A and B of FIGS. 5A-C are merely intended for the sake of illustration, and are not intended to be limiting as to a manner in which the number of state data values $N_t$ that may be transferred during an idle time or average idle time of the DSMS 106 may be calculated. To the contrary, it may be appreciated that a number of techniques may exist or may be developed for considering collisions between state data value transfers during system idle times and commencement of normal system processing, and that techniques for calculating corresponding numbers of values $N_t$ that may be transferred during such idle times may be determined with respect to any such technique.

As described in detail herein, the duration of a migration $T_M$ for an individual state to be migrated is generally a function of the amount of time associated with transferring state data values (e.g., corresponding to state data value transfers into the portions 214/210 of FIG. 2), as well as time corresponding to the arrival of new data values (e.g., portion 206 of FIG. 2). Therefore, Equation 2 expresses an estimation for calculating an average number $\overline{N}_i$ of incoming values that may be received during system processing times (e.g., during times 504A/504B or 518 of FIGS. 5A, 5B). Thus, an example calculation for estimating the average number of new, incoming data values during available system processing times is represented by Equation 2:

$$\overline{N}_i = (N_i/T) * T_{syst} \quad \text{Equation 2}$$

As shown, the estimated average of new, incoming values $\overline{N}_i$ may be represented as a function of a number of input values $N_i$ divided by an average duration of system processing associated with the particular data stream in question. In the example of equation 2, it is assumed that the DSMS 106 may process a plurality of queries and/or associated data streams, although the simplified examples of FIGS. 1-4 describe only scenarios in which a single query and data stream are processed. Nonetheless, as is well known, conventional implementations of the DSMS 106 may in fact utilize available system processing times to process multiple data streams and associated queries, so that a particular query may only be provided with a fraction of an available system processing time. In such cases, as in equation 2, the average number of new incoming values or $N_i$ for the data stream and query in question may be determined relative to a fraction of a total system processing time $T_{syst}$ representing the total available system processing time for all processed data streams and/or queries.

Subsequently, a number $N_C$ of cycles of the DSMS 106 system required to perform migration of a single state and associated count-based window size $w_n$ may be expressed with respect to the resulting, calculated parameters $N_t$ and $\overline{N}_i$ of Equations 1 and 2, as shown in Equation 3:

$$N_C = w_n / (N_t + \overline{N}_i) \quad \text{Equation 3}$$

Specifically, as shown, for a given window size $w_n$, the number of cycles $N_c$ required to complete the migration may be calculated with respect to estimation of the number of values that may be transferred during the idle time $N_t$ and the average number of new, incoming data values $\overline{N}_i$.

In other words, in a simple example provided with respect to FIG. 5B, it may occur that, as shown, after transfer of four complete state data value(s), only approximately 70% of state data value(s) of a subsequent transfer (516) complete prior to arrival of an event. At that time, system processing 518 is prioritized, whereupon the remaining 30% is transferred (520) after the system processing 518 completes.

From equations 2 and 3, a number $N_n$ of new values to be included in the new window with the window size $w_n$ may be calculated using Equation 4:

$$N_n = \text{floor}[\overline{N}_i * N_C] \quad \text{Equation 4}$$

As shown, the number $N_n$ of new values included in the new window may be expressed as a function of the number of cycles $N_c$ and the average number $\overline{N}_i$ of input values for the data stream in question.

Then, finally, the total migration time for the individual state migration may be determined using equation 5:

$$T_M = (N_n/N_i) * T \quad \text{Equation 5}$$

As shown, the migration time $T_M$ for the individual state may thus be expressed as a function of the new values $N_n$ relative to the number of input values $N_i$, and relative to the average duration between events T.

Thus, FIGS. 5A-C and equations 0-5 illustrate example calculations by which the migration estimator 136 may calculate a migration time $T_M$ for a given state, as illustrated with respect to FIG. 2. Thus, as described in detail below with respect to FIG. 6, the migration estimator 136 may utilize the techniques of FIGS. 5A-C, and of Equations 0-5, so as to iteratively calculate individual migration times for each window of the sorted list of new windows 310-316 of FIG. 3B. In particular, for example, the migration estimator 136 may execute the calculations of Equations 0-5 for a given migration time of an associated new window, but using the count-based representation of reduced window sizes (e.g., $w^*_{C'}$ and $w^*_{A'}$) which result from operations of the migration estimator 136 in successively calculating individual migration times 318-322, as described herein.

Figure 6:
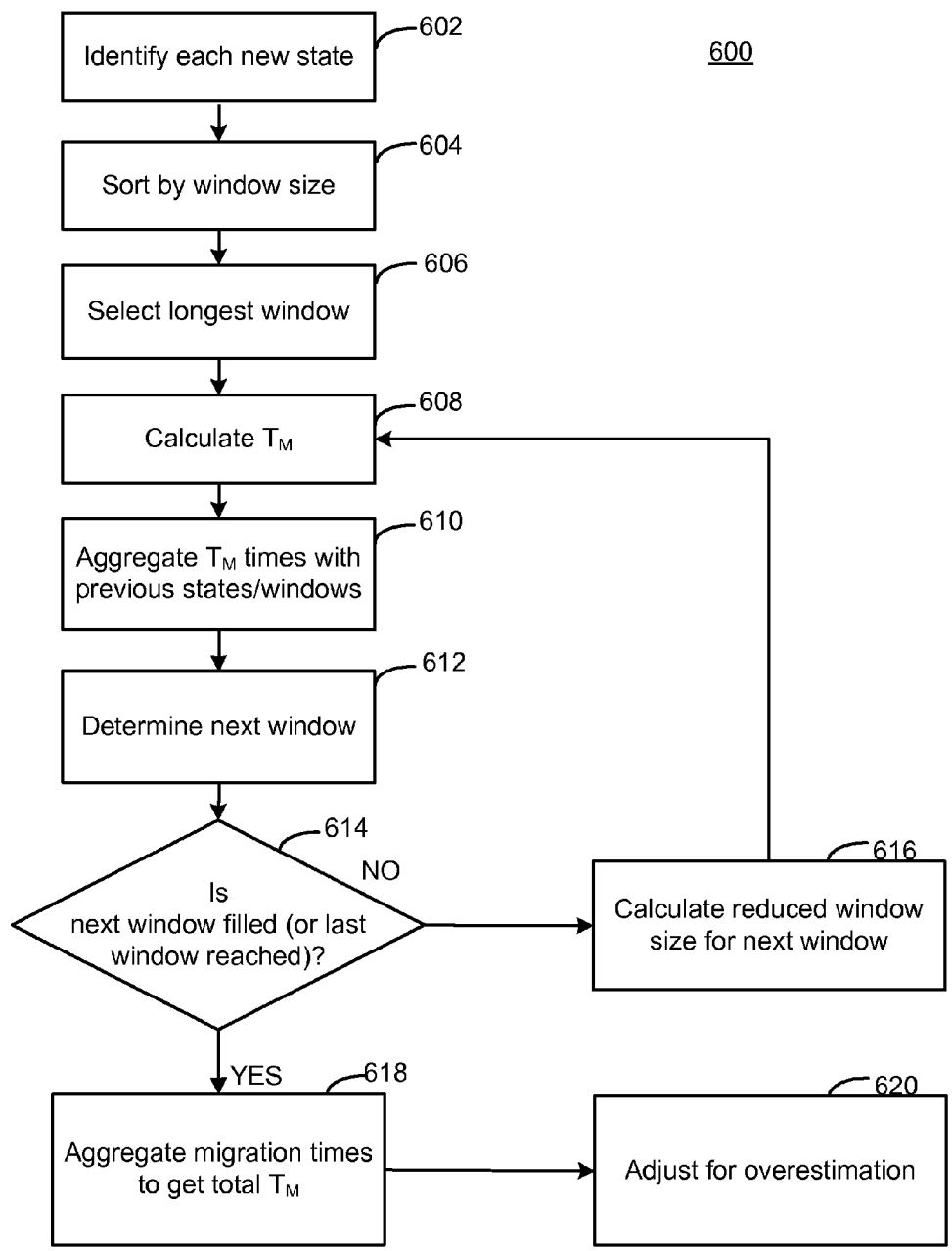
FIG. 6 is a flowchart illustrating more detailed example operations of the system of FIG. 1.

FIG. 6 is a flowchart 600 illustrating more detailed example operations of the systems and methods of FIGS. 1-5. In particular in the example of FIG. 6, each state to be migrated may be identified (602). For example, the window sorter 134 may receive notice of request from the request handler 132 from migration of the query 110 to the new query 122, whereupon the window sorter 134 may identify any and all associated states of the query 110 and operators 112-117 that may be transferred as part of the migration. The window sorter 134 may thereby obtain corresponding time-based window sizes associated with each new state, and may proceed to sort the windows by window size (504), e.g., by organizing the windows from longest duration to shortest duration, as illustrated above with respect to FIG. 3A.

The migration estimator 136 may then select the longest window (606), e.g., the new window 310 of FIG. 3B, and may proceed to calculate the associated migration time that is required for migration of the corresponding state (e.g., the migration time $T_{M,B}$ 318 for the state $Z_B$). The migration aggregator 138 may aggregate the next-calculated migration time with previously calculated migration times of previously considered states/windows (610), if any. In the specific example, since the new window 310 is the longest and therefore the first new window to be considered for calculation of the associated migration time, it is not necessary to perform such aggregation during this iteration.

Thus, the migration estimator 136 may determine the next (i.e., the next-longest) window size (612). In the example of FIG. 3B, the next window would thus be new window 312 associated with the state $Z_C$ of the new operator 127.

If the next window has not yet been filled by accumulated, newly-arrived data values (614), then the migration estimator 136 may calculate a reduced window size for the next window (616). For example, as shown and described, the migration estimator 136 may calculate the reduced window size $w^*_{C'}$ which has been reduced from the new window size $w^*_C$ by an amount equivalent to portions 310A/312A. Then, calculation of the migration time for the currently considered new window 312 may proceed using the reduced window size, e.g., using the reduced window size for the value of $w_n$ of Equation 3.

During the present iteration, the thus calculated migration time $T_{M,C'}$ 320 may be aggregated by the migration aggregator 138 with the previously determined migration time $T_{M,B}$ 318 for the new window 310 (610), and the migration estimator 136 may then determine the next available window (612). In the example, the next window 314 is not yet filled by the newly arriving values which may have been received during migration of the new windows 310/312, as illustrated by portions 314A/314B relative to portions 314C/314D. Consequently, again, the reduced window size $w^*_A$, may be determined (616) and used to calculate a migration time $T_{M,A'}$ 322 for the new window 314 (608).

In this iteration, the migration times 318, 320, 322 may be aggregated (610), and a next window may be determined (612). In the example, the next new window 316 is, as illustrated by portions 316A, 316B, filled with newly-arrived values, so that no further migration (e.g., no transfer state data values) is required. Consequently, iterations over the sorted new windows list of the windows 301-316 may be understood to be completed (614), so that a total migration time $T_M$ 324 may be calculated (618).

As may be appreciated, in the example of FIG. 6, the migration aggregator 138 may simply be required at this point to output the previously aggregated migration time 318-322 to the user of the system 100, using the GUI 130. In the example of FIG. 3B, the new window 316 happens to be the last/final new window of the windows 310-316. However, it may be appreciated from the example of FIG. 6, that, in other example implementations, there may be additional new windows having window sizes shorter than that of the new window 316 associated with the state $Z_D$ of the operator 128. In such cases, nevertheless, it may be appreciated that any such shorter windows need not have additional migration times calculated or included within the total migration time $T_M$ 324, because, as with the new window 316 itself, any such shorter window sizes would be completely filled by newly-arriving data values during the previous migration times 318-322.

Similarly, but conversely, in the example of FIGS. 3B and 6, it may occur that the migration estimator 136 is not required to calculate any additional, incremental migration time associated with the final new window 316. However, in additional or alternative examples, this may not be the case. For example, if the new window 316 was, e.g., 50% longer than in the example of FIG. 3B, it would yet be necessary for the migration estimator 136 to calculate a corresponding migration time $T_{M,D'}$ (not illustrated in FIG. 3B), using a reduced window size $w^*_{D'}$. In other words, the decision point of the operation 614 may be considered to include the possibility that the last window may be reached without having been completely filled, in which case the example of FIG. 6 would simply proceed to complete aggregations by the migration aggregator 138 of all calculated migration times, including the hypothetical migration time $T_{M,D'}$.

In the examples of FIGS. 3B and 6, it may be observed that state data value transfers are considered to occur for values that are actually received as new values. In particular, values of the state $Z_B$ received during the time periods indicated by the migration times $T_{M,C'}$ 320 and $T_{M,A'}$ 322 are illustrated as being transferred, when, in fact, as may be observed from the example of FIG. 2, state data values within these time periods would in fact be filled by new values, not transferred values.

This may result in an overestimation of the total migration time. Consequently, a compensation or adjustment may be made for such a potential of estimation (620). For example, the number of transferred and/or new values may be adjusted using an iterative approach.

Nonetheless, in many example implementations, the estimations provided above with respect to preceding operations 616-618 of FIG. 6 may provide sufficiently accurate and timely estimations of the total migration times $T_M$ 324 to be of use for the user of the system 100 of FIG. 1. Thus, as described, the various implementations of the systems and methods of FIGS. 1-6 may be utilized to provide the user of the system 100 with sufficiently accurate and timely information for the user to utilize the data stream management system 106, and, in particular, to execute data stream query migrations in association therewith, in a predictable, and therefore efficient and productive, manner.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor; and
   a non-transitory computer-readable storage medium comprising instructions stored thereon that, when executed by at least one processor, are configured to cause the system to implement:
   a request handler configured to:
      determine a query of a data stream management system (DSMS), the query currently being executed using stored stream data within a buffer associated with the query, the stored stream data being received from at least one data source and being removed from the buffer in association with new stream data being received, wherein the stored stream data includes at least one original window of state data from the stream data; and
      determine a new query having at least first new window, a second new window, and a third new window corresponding to the at least one original window of the query;
   a windows sorter configured to cause the system to sort the first, second, and third new windows from longest duration to shortest duration, the first new window having the longest duration and the third new window having the shortest duration; and
   a migration estimator configured to:
      calculate a first reduced window size for the second new window based on new state data values collected during a transfer of new state data values associated with the first window;
      calculate a second reduced window size for the third new window based on new state data values collected during the transfer of new state data values associated with the first window and a transfer of new state data values associated with the second window; and
      calculate at least a first migration time for the first new window, a second migration time for the first reduced window size for the second new window, and a third migration time for the second reduced window size for the third new window, the first, second, and third migration times being times for migrating state data from the at least one original window to the first new window, the second new window, and the third new window.

2. The system of claim 1, wherein the original and new windows are expressed as durations in units of time.

3. The system of claim 2, wherein:
   the original and new windows are initially received as being expressed in terms of a number of tuples of the stream data, and
   the system further comprises a converter configured to convert the original windows for expression thereof as durations in units of time.

4. The system of claim 1, wherein the original and new windows are expressed in terms of a number of tuples of the stream data.

5. The system of claim 4, wherein the original and new windows are initially received as being expressed as durations in units of time, and wherein the migration estimator includes a converter configured to convert the original windows for expression thereof in terms of a number of tuples of the stream data.

6. The system of claim 1, further comprising the DSMS configured to process arriving events within the stream data to execute migration of state data from the at least one original window to at least one of the first, second, and third new windows between the processing of the arriving events.

7. The system of claim 6, wherein the processing of the arriving events is aperiodic.

8. The system of claim 6, wherein the migration estimator is configured to calculate an individual migration time for a corresponding state using an average measure of idle times to determine a number of state data values that can be transferred in each idle time.

9. The system of claim 6, wherein the at least one migration time for a state is a function of a number of corresponding state data values of the corresponding state to be transferred, and a function of a number of arriving events for the state which arrive during the processing.

10. The system of claim 1, further comprising the DSMS configured to process the stream data and to process the query during the migration of the at least new window of the new query.

11. The system of claim 1, wherein the first, second, and third migration times for the first, second, and third new windows are functions of sizes of the first, second, and third new windows.

12. The system of claim 1, wherein the instructions are further configured to cause the system to implement a migration aggregator configured to aggregate the first, second, and third migration times to obtain a total migration time.

13. The system of claim 12, wherein the migration estimator is configured to calculate the third migration time for the second reduced window size, the second reduced window size being completely filled by data values arriving during the first and second migration times so that the third migration time does not need to be included in the total migration time.

14. A computer-implemented method executing instructions stored on a non-transitory computer readable storage medium, the method comprising:
   determining a query of a data stream management system (DSMS), the query currently being executed using stored stream-related data within a buffer associated with the query, the stored stream-related data being obtained from stream data received from at least one data source and being removed from the buffer in association with new stream data being received, wherein the stored stream-related data includes at least one original window of state data from the stream data;
   determining a new query having at least a first new window, a second new window, and a third new window corresponding to the at least one original window of the query;

sorting the first, second, and third new windows from longest duration to shortest duration, the first new window having the longest duration and the third new window having the shortest duration;
calculating a first reduced window size for the second new window based on new state data values collected during a transfer of new state data values associated with the first new window;
calculating a second reduced window size for the third new window based on new state data values collected during the transfer of new state data values associated with the first new window and a transfer of new state data values associated with the second new window; and
calculating at least a first migration time for the first new window, a second migration time for the first reduced window size for the second new window, and a third migration time for the second reduced window size for the third new window, the first, second, and third migration times being times for migrating state data from the at least one original window to the first new window, the second new window, and the third new window.

15. The method of claim 14, further comprising processing arriving events within the stream data using a DSMS, and migrating state data from the at least one original window to at least one of the first, second, and third new windows between the processing of the arriving events.

16. The computer-implemented method of claim 14, further comprising aggregating the first, second, and third migration times to obtain a total migration time.

17. A non-transitory computer program product comprising stored instructions that are configured to cause a data processing apparatus to:
determine a query of a data stream management system, the query currently being executed using stored stream-related data within a buffer associated with the query, the stored stream-related data being obtained from stream data received from at least one data source and being removed from the buffer in association with new stream data being received, wherein the stored stream data includes at least one original window of state data from the stream data;
determine a new query having at least a first new window, a second new window, and a third new window corresponding to the at least one original window of the query;
sorting the first, second, and third new windows from longest duration to shortest duration, the first new window having the longest duration and the third new window having the shortest duration;
calculate a first reduced window size for the second new window based on new state data values collected during a transfer of new state data values associated with the first new window;
calculate a second reduced window size for the third new window based on new state data values collected during the transfer of new state data values associated with the first new window and a transfer of new state data values associated with the second new window; and
calculate at least a first individual migration time for the first new window, a second migration time for the first reduced window size for the second new window, and a third migration time for the second reduced window size for the third new window, the first, second, and third migration times being times for migrating state data from the at least one original window to the first new window, the second new window, and the third new window.

18. The non-transitory computer program product of claim 17, wherein the
second reduced window size is zero, so that the third migration time is also zero.

19. The method of claim 16, wherein the second reduced window size is completely filled by data values arriving during the first and second migration times so that the third migration time does not need to be included in the total migration time.

20. The non-transitory computer program product of claim 17, wherein the instructions are further configured to cause the data processing apparatus to aggregate the first, second, and third migration times to obtain a total migration time for the query.

21. The non-transitory computer program product of claim 20, wherein the second reduced window size is completely filled by data values arriving during the first and second migration times so that the third migration time does not need to be included in the total migration time.

* * * * *